United States Patent
Wormsbaecher

[19]

[11] Patent Number: 6,158,916
[45] Date of Patent: Dec. 12, 2000

[54] UNIVERSAL JOINT CONNECTOR

[75] Inventor: Hans Wormsbaecher, Lake Orion, Mich.

[73] Assignee: GKN Automotive, Inc., Auburn Hills, Mich.

[21] Appl. No.: 09/146,874

[22] Filed: Sep. 3, 1998

[51] Int. Cl.[7] .............................. F16B 3/00; F16D 3/50
[52] U.S. Cl. ..................... 403/310; 403/315; 403/338; 403/341; 403/309; 464/906; 464/146
[58] Field of Search .................. 403/309, 310, 403/311, 371, 372, 335, 358, 341, 315; 464/906, 146, 78

[56] References Cited

U.S. PATENT DOCUMENTS

| Re. 32,830 | 1/1989 | Hazebrook | 464/906 X |
|---|---|---|---|
| 1,769,967 | 7/1930 | Saurman et al. | 403/309 |
| 2,089,168 | 8/1937 | Brown | 403/259 |
| 2,510,362 | 6/1950 | Anderson | 464/175 |
| 2,578,764 | 12/1951 | Trbojevich | 175/906 X |
| 3,324,683 | 6/1967 | Schroter | 464/146 |
| 3,400,557 | 9/1968 | Westercamp | 464/146 |
| 3,449,926 | 6/1969 | Hawkins | 464/154 |
| 3,696,638 | 10/1972 | Smith et al. | 464/906 X |
| 3,917,425 | 11/1975 | Allaben, Jr. | 403/371 |
| 3,928,985 | 12/1975 | Girguis | 464/906 X |
| 3,972,633 | 8/1976 | Wright | 403/1 |
| 4,185,476 | 1/1980 | Krude | 464/146 X |
| 4,224,808 | 9/1980 | Gehrke | 464/146 X |
| 4,231,232 | 11/1980 | Otsuka et al. | 464/146 |
| 4,447,066 | 5/1984 | Katagiri et al. | 277/212 |
| 4,610,643 | 9/1986 | Krude | 464/906 X |
| 4,756,640 | 7/1988 | Gehrke | 403/326 |
| 4,813,808 | 3/1989 | Gehrke | 403/326 |
| 4,950,206 | 8/1990 | Jacob | 464/906 X |
| 5,217,410 | 6/1993 | Schwarzler | 464/906 X |
| 5,221,233 | 6/1993 | Jacob | 464/906 X |
| 5,230,659 | 7/1993 | Bird et al. | 464/906 X |
| 5,354,068 | 10/1994 | Maleski | 403/371 X |
| 5,634,737 | 6/1997 | Voss et al. | 403/349 |
| 5,807,180 | 9/1998 | Knodle et al. | 464/906 X |
| 5,951,198 | 9/1999 | Phillips | 403/371 X |

FOREIGN PATENT DOCUMENTS

| 0061720 | 3/1991 | Japan | 464/146 |
|---|---|---|---|
| 1434691 | 5/1976 | United Kingdom | 403/371 |

OTHER PUBLICATIONS

Con–Vel Inc., Convel: Constant Velocity Joints, Jan. 1994.
Lobro, Constant Veolcity Joints for Transmission in Mechanical Engineering, Mar. 1989.

*Primary Examiner*—Anthony Knight
*Assistant Examiner*—Danielle Somrak
*Attorney, Agent, or Firm*—Mick A. Nylander

[57] ABSTRACT

A connector for securing a constant velocity universal joint having a housing to a coupling member, the housing and coupling member each having an inner surface and an outer surface. The connector includes an annular member having a first end, a second end, and a plurality of openings which extend axially from the first end to define a series of radially expanding panels for receiving the constant velocity universal joint and coupling member. The joint and coupling member each have respective mating surfaces which engage each other. The first end of the annular member engages the outer surface of the coupling member and the second end of the annular member is disposed proximate the outer surface of the housing. The mating surfaces are splined for transmitting torque. At least one wave spring is provided with the connector to accommodate axial deviation.

10 Claims, 2 Drawing Sheets

UNIVERSAL JOINT CONNECTOR

TECHNICAL FIELD

This invention relates to a connector for a constant velocity universal joint and an associated coupling.

BACKGROUND ART

On typical rear-wheel drive vehicles, the engine and transmission are mounted on the vehicle frame, and the driving wheels are free to move up and down in relation to the frame. This design causes constant changes in the angularity of the driveline during vehicle operation. Therefore, constant velocity universal joints are used to provide the necessary flexibility in the driveline or drive train to accommodate these changes in angularity. Universal joints are typically employed at the front and rear of the propeller shaft. The front universal joint is connected to the gearbox output shaft by a coupling. The rear universal joint is connected by a yoke to the differential drive pinion gear shaft. This balanced arrangement of power transfer components serves to compensate for any changes in the driveline. Vehicles having two propeller shafts also have a third universal joint provided therebetween.

The propeller shaft on rear-wheel drive vehicles may be formed of solid tubular steel having a one-piece construction. On typical front-engine rear wheel drive vehicles, the propeller shaft transmits the driving effort from the mainshaft of the gearbox to the final drive. The final drive, in turn, is mounted either to a sprung rear axle or, in the case of vehicles having independently sprung and driven rear wheels, to a separate housing attached to the vehicle structure. In light, medium, and heavy-duty vehicles with front engines, a transmission gearbox is separated from the final drive by the propeller shaft. The driveline connects the transmission with the rear driving axles and effectively transmits engine power to the driving wheels.

One type of universal joint commonly used in today's automobiles is a plunging type constant velocity universal joint of the tripod or ball and cage variety. Tripod-type constant velocity universal joints are characterized by an outer joint disposed around an inner joint which has a plurality of arms projecting therefrom which travel in the grooves of the outer joint. The plunging ball and cage joint type resembles the classic Rzeppa design but with plunging or end motion character. Plunging constant velocity universal joints allow the shaft which interconnects with the universal joint to change length during operation without the use of splines. Plunging joints are widely used on the inboard (transmission side) joint of front-wheel drive vehicles.

The transmission gearbox has a mainshaft or output shaft which has attached to it a gearbox flanged coupling which is coupled to a propeller shaft in order to transmit torque to the propeller shaft. As stated, a constant velocity universal joint is provided between the gearbox and the propeller shaft, and is coupled to the gearbox flanged coupling, in order to provide for angular deviation therebetween. The flange of both the gearbox flanged coupling and the flange of the mating universal joint each has typically six holes in respective alignment with each other, allowing them to be coupled via corresponding press-fit bolts and lugnuts.

This method of coupling the gearbox to the universal joint of the propeller shaft, however, is costly in terms of time, labor and piece price. It requires alignment between the corresponding holes and time involved in securing the six sets of bolts and nuts. Further, should the gearbox or constant velocity joint require maintenance, repair or replacement, any disassembly of the components may also prove to be time consuming. For example, it may be the case where the nuts and bolts become inseparable, thereby requiring a great amount of time and effort in separating the mating flanges. Vibration of the driveline may also be a concern after disconnection and subsequent reconnection of the propeller shaft from the gearbox. Because it is desired to preserve as much as possible the original state of balance, any loss of clamping load and separation at the mating faces of the coupled flanges may in some instances possibly introduce vibration into the driveline.

Under the current arrangement, the friction forces acting between the mating faces of the coupled flanges are being fully exploited to transmit the torque from the gearbox to the propeller shaft. The externally applied load acts in a plane perpendicular to the bolt axis and is transmitted by the frictional forces acting between the contacting faces of the constant velocity joint and the gearbox, which are tightly clamped together by these press-fit bolts and lugnuts.

Consequently, there is a need to improve the connection between the constant velocity joint of the propeller shaft to the adjoining gearbox or similar component, as well as a need for an assembly including a propeller shaft, constant velocity joint and gearbox which allows for a less costly assembly in terms of time, labor and part price, as well as allowing for less costly and less difficult maintenance and repair of the mating components. The improved connection and assembly should also allow for less noise, vibration and harshness, and should also provide for a better and more efficient torque transmittal between the mating components.

Brief Summary Of The Invention

It is an object of the present invention to provide an improved constant velocity universal joint and companion flange design and connection according to the present invention.

It is another object of the present invention to provide an improved constant velocity universal joint connection with a propeller shaft and gearbox according to the present invention which allows for a less costly manufacture and assembly.

It is a further object of the present invention to provide an improved constant velocity universal joint and driveline assembly which allows for a less costly and less difficult maintenance and repair.

It is moreover another object of the present invention to provide an assembly including a propeller shaft, constant velocity universal joint and gearbox assembly, wherein the mating constant velocity universal joint and gearbox assembly transmit torque to each other more easily and efficiently.

It is still another object according to the present invention to provide an assembly and connection of the above components which reduces the level of noise, vibration and harshness in the gearbox-propeller shaft coupling.

In carrying out the above objects, features and advantages of the present invention, the invention provides a connector which secures a constant velocity universal joint to a coupling member. Specifically the constant velocity universal joint has a housing or outer race which is attached to the coupling member, each of the housing and coupling member have an inside mating surface and an outer end. The connector includes an annular member which has a first end, a second end, and a plurality of openings which extend axially from the first end and define a series of radially expanding panels. These panels in the radially expanded state receive the constant velocity universal joint and the coupling member therein so that their respective inside mating surfaces are in engagement with each other. Also, the first end of the annular member is for engaging the outer end of the coupling member, and the second end of the annular member is disposed proximate the outer end of the housing. In a preferred embodiment, at least one spring is provided and disposed between the second end of the annular member and the outer end of the housing and which accommodates axial deviation in the connector. In a more preferred embodiment, the at least one spring is an annular wave spring. The openings of the annular member which extend axially are relatively narrow and extend to a location partially along the length of the annular member. The location is preferably between the range of 60 percent to 90 percent of the overall length of the annual member measured from the first end. Still in a further preferred embodiment, the first end of the annular member includes an annular tooth for receiving the coupling member and for securing the annular member and the coupling member.

In another embodiment, disclosed is a constant velocity joint and gearbox assembly which includes a constant velocity universal joint which has an annular housing with a housing mating surface and a housing end surface. Also included is a gearbox which has a coupling member having a coupling mating surface which engages the housing mating surface. The coupling end surface has an annular groove which is formed therein. Further included is a connector member which has an annular cross-section which receives the housing and the coupling member. The connector member includes a connector first end which is received by the annular groove of the coupling end surface and a connector second end which is disposed about the housing end surface. Further included is a plurality of openings which run axially from one of the connector first end and connector second end and defines a plurality of panels which are capable of radially expanding in order to receive the housing and the coupling member within. Also included is an at least one spring which is disposed between the other of the connector first end and connector second end and adjacent one of the housing end surface and coupling end surface, for accommodating axial deviation of the connector member. In a preferred embodiment, the housing mating surface and the coupling mating surface each include a plurality of splines for operably engaging each other so that one of the coupling member and constant velocity joint may transmit torque to the other.

The above objects and other objects, features and advantages of the present invention are readily apparent from the following detailed description of the best modes for carrying out the invention when taken in connection with the accompanying drawings wherein like reference numerals correspond to like components.

Best Mode For Carrying Out the Invention

Figure 1:
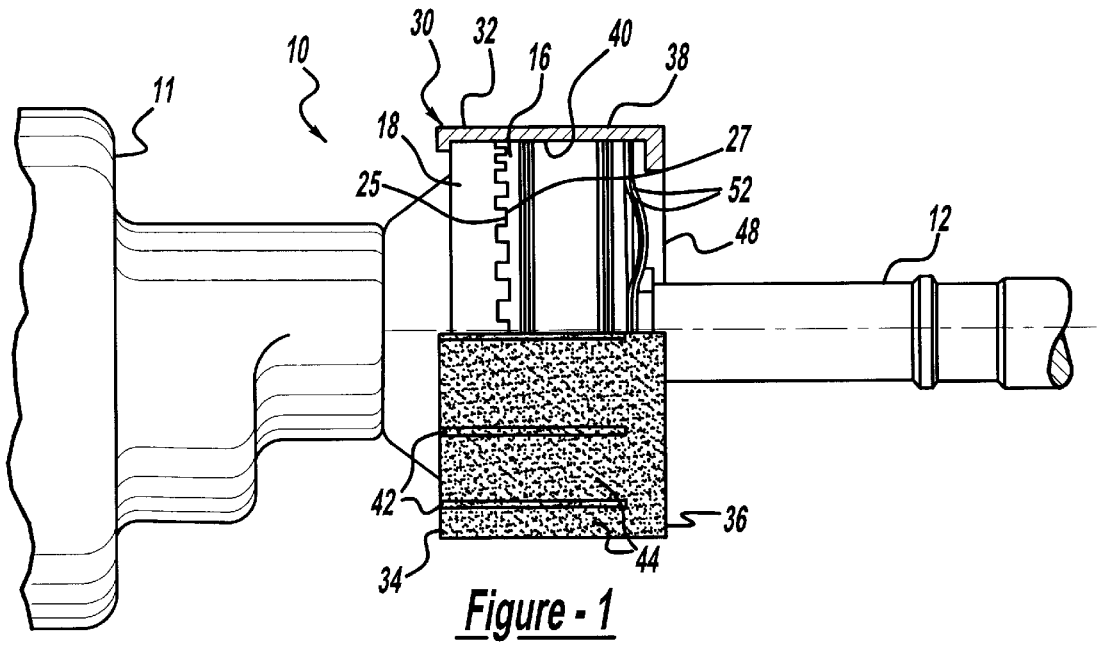
FIG. 1 is a partially cross-sectional side view of the connector assembly according to the present invention in its operable environment.

In accordance with the teachings of the present invention, FIG. 1 of the drawings shows a partial side-view of a propeller shaft and gearbox assembly for use in a motor vehicle. Such assembly 10 is typically included in front-engine, rear-wheel drive or four-wheel drive vehicles which incorporates a fore-and-aft mounting for an engine (not shown) combined into a single unit with either a manually or an automatically controlled transmission gearbox 11. Assembly 10 is included as part of the driveline of a vehicle. With continued reference to FIGS. 1 and 2, propeller shaft and gearbox assembly 10 includes a propeller shaft 12 which has mounted thereto at its front end a constant velocity universal joint 14. As is well-known in the art, constant velocity universal joint 14 is attached in a manner such that it is able to articulate in relation to propeller shaft 12 (output shaft). Propeller shaft 12 transmits power from gearbox 11 to the final drive of the vehicle in order to turn the rear wheels.

Constant velocity universal joint 14, in turn, has a flange portion 16 which is mated with a companion flange 18, shown in the drawings as a gearbox output flange, in a manner according to the present invention. It is contemplated that the teachings according to the present invention may be applied to any flange which is mated with a constant velocity joint flange. Mainshaft 21 (input shaft) of gearbox 11 transmits power from the transmission gears (not shown) to gearbox output flange 18, which in turn transfers power to constant velocity joint 14, as discussed herein.

Constant velocity universal joint 14 includes a substantially annular outer race 20 or housing and is rotatable about an axis 22. Outer race 20 includes an outer surface 24, and an inner surface 26 which defines an inner cavity 28 within. As is well-known in the art, a boot or grease cap (not shown) may also be included as part of constant velocity joint 14 in order to contain the grease stored therein and to shield inner cavity 28 from contaminants and other foreign objects detrimental to the function of constant velocity joint 14. The inner portion of constant velocity joint 14 is illustrated herein as being of the plunging ball-and-cage type having a ball 15, cage 17 and plunging track 19. However, it is fully contemplated that the teachings according to the present invention may be applicable to any type of constant velocity universal joint suitable for the application, such as a plunging tripod joint. Plunging or telescopic joints are typically used in propeller shaft and gearbox assemblies like that shown as reference numeral 10, in order to accommodate small variations in the effective length of the driveline.

Propeller shaft 12 attaches at its rear end to the differential assembly (not shown) and gives power to the side shafts (not shown) of the motor vehicle. The differential assembly is a gear system typically employed in rear-wheel drive vehicles to transfer power from propeller shaft 12 to the side shafts (not shown). The differential assembly uses a drive pinion gear which mates with an adjoining ring gear to act as a conduit for the power transfer from propeller shaft 12 to the side shafts. More particularly, power is transferred from the propeller shaft to the differential case, wherein the side shafts are splined to the side output gears at a right angle to the longitudinal axis of the propeller shaft 12.

Gearbox output flange 18 is typically press fit into gearbox 11 at one end to keep runout low. Gearbox output flange 18 has a mating surface 25 which engages, and in a preferred embodiment mates with mating surface 27 of corresponding flange portion 16 of constant velocity universal joint 14.

Figure 2:
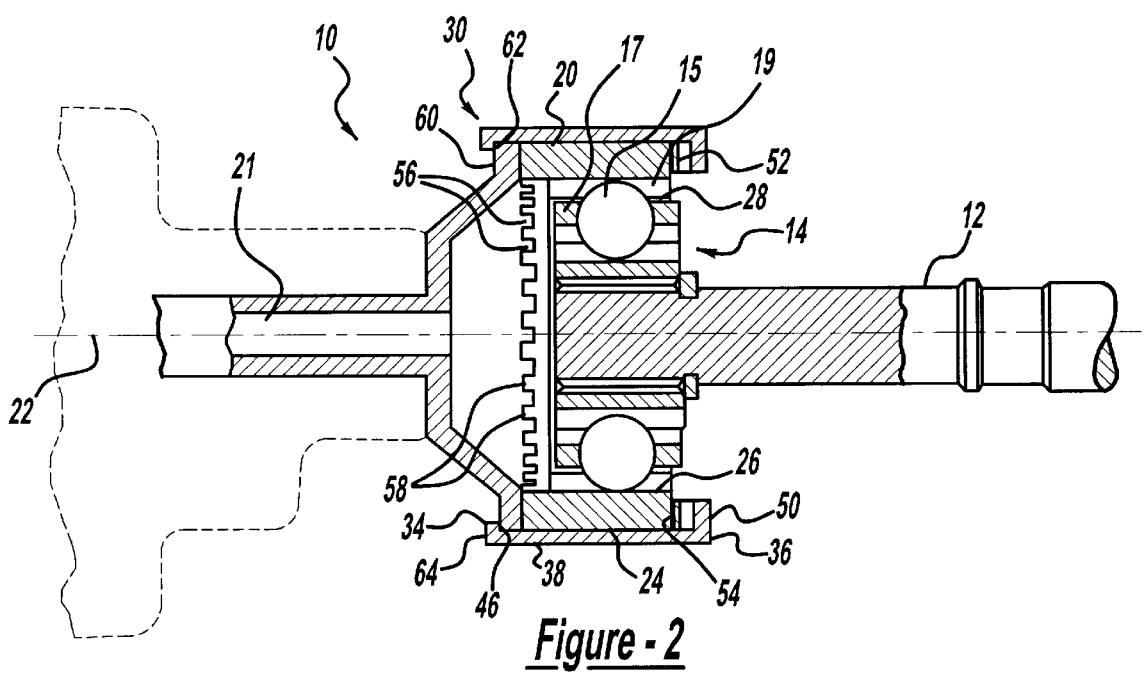
FIG. 2 is a cross-sectional side view of the connector assembly shown in FIG. 1
Figure 3:
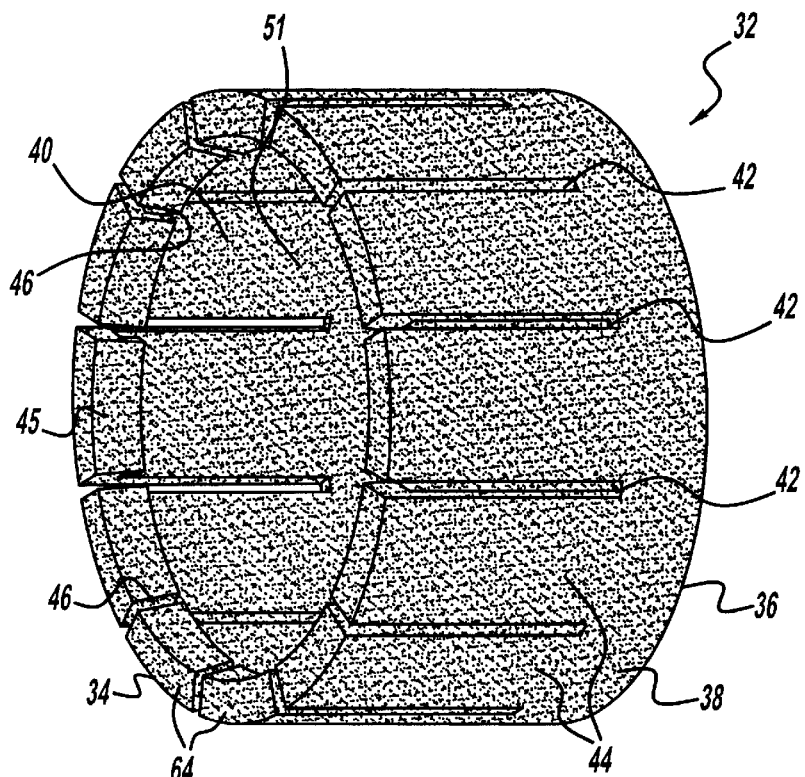
FIG. 3 is a perspective view of a connector according to the present invention.
Figure 4:
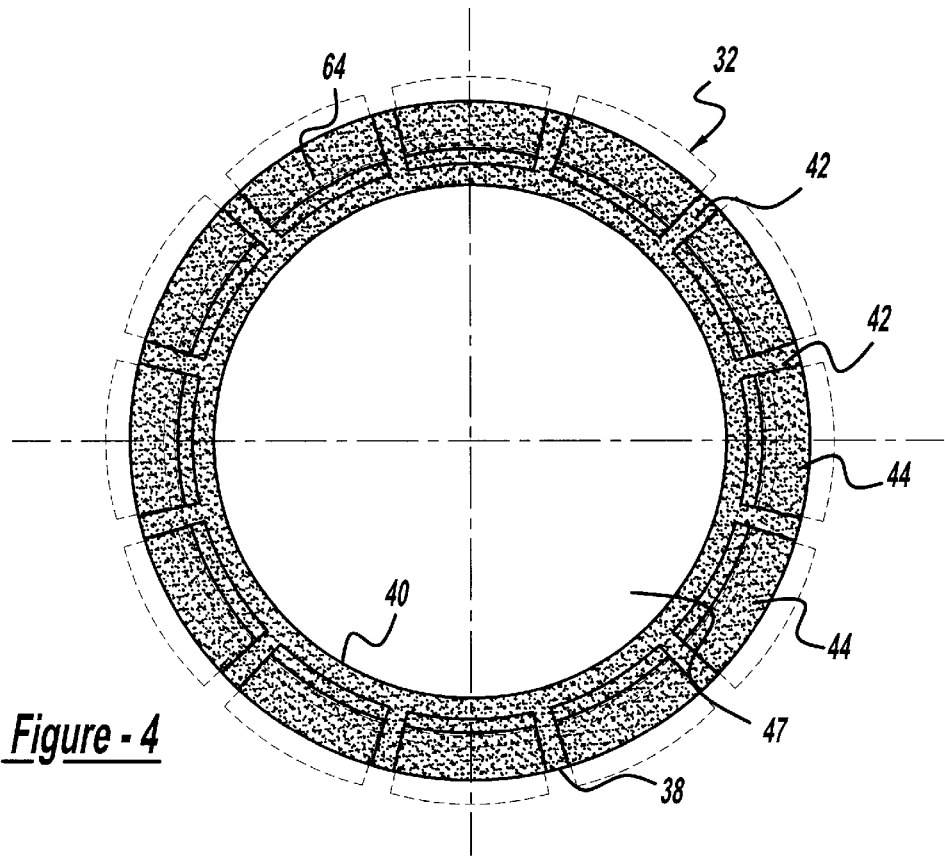
FIG. 4 is an end view of the connector according to the present invention and illustrates in phantom the panels of the connector in a radially expanded state.

As shown in FIGS. 1–4, and as best shown in FIG. 3, a connector assembly 30 is provided according to the teachings of the present invention. As shown in FIGS. 1–3, connector assembly 30 includes an annular connector member 32 having a first axial end 34, a second axial end 36, an outer surface 38 and an inner surface 40. As shown, connector member 32 is substantially cylindrical and is formed of a plastic material and preferably of a thermoplastic material. As shown in FIGS. 3 and 4, connector member 32 also includes a plurality of relatively narrow, axial elongated openings 42 which are shown extending from first axial end 34 partially along the entire length of connector member 32. Of course, openings 42 may also extend from second end 36. Particularly, each opening 42 runs parallel to each other and extends axially to a location partially along the length of connector member 32. In a preferred embodiment, the location to which each opening 42 extends is to a position which is approximately between the range of 60%–90% of the entire length of the connector 32.

With reference to FIG. 4 of the drawings, the plurality of elongated openings 42 allow connector member 32 to expand radially in order to receive the outer race 20 and gearbox output flange 18 to achieve the assemblies of FIGS. 1–2, as explained more fully herein. More particularly, openings 42 allow connector member 32 to be divided into a plurality of panels 44 which expand radially for receiving constant velocity joint 14 and gearbox output flange 18 therein. The radially expanded state of connector member 32 is depicted in phantom in FIG. 4, while the static or rest state of connector 32 is shown in solid lines. Each panel 44 has, at first end 34 of connector 32, a tapered surface 45 terminating in an inner tooth edge 46. The plurality of inner tooth edges 46 define an overall annular tooth. Tapered surface 45 provides an advantage over a square surface, allowing ease of assembly as it provides a ramp surface for constant velocity joint 14 and gearbox output flange 18 to slide into cavity 28.

Further, connector member 32 has a first opening 47 proximate first end 34 which is defined by tapered surface 45 of the plurality of tooth edges 46 and is formed radially inward of inner surface 40. A second opening 48 proximate second end 36 of connector 32 is defined by second end wall 50 of connector member 32. Connector assembly 30 also includes at least one annular wave spring 52 located adjacent second opening 48 and supported in connector member 32 by second end wall 50 on one side, and constant velocity joint 14 (or its outer race 20) on the other. Wave spring 52 accommodates any axial deviation that may exist between constant velocity joint 14 and gearbox output flange 18 in conjunction with their fit into connector member 32. Moreover, any number of wave springs 52 may be used to provide the desired result. For example, a pair of wave springs 52 is shown in FIGS. 1 and 2 of the drawings herein.

Functionally, connector assembly 30 maintains the engagement of inside mating surfaces 25 and 27 of flange portion 16 and gearbox output flange 18 respectively without the use of lugnuts and press-fit bolts of prior art assemblies. Gearbox output flange 18 has formed in its outside surface 60 an annular groove 62. This groove 62 is received by a respective inner tooth edge 46 of connector member 32.

A typical procedure for assembling assembly 10 is described herein. As shown in phantom in FIG. 4, first end 34 of connector member 32 is radially expanded from its original static state shown in FIG. 3 and in solid in FIG. 4. More particularly, with further reference to FIG. 4, the plurality of panels 44 of connector member 32 which are separated by axial openings 42 are each able to radially expand under sufficient force to temporarily displace the panels 44 radially outward. The plastic material used for connector member 32 should be flexible in order to allow this temporary expansion as shown in phantom in FIG. 4, while elastically permitting the contraction of first end 34 to its original static state.

Such expansion of first end 34 allows outer race 20 to be inserted into expanded first end 34 of connector member 32 and received within cavity 51 of connector member 32, wherein a second (or outer) end 54 of constant velocity universal joint 14 engages spring 52. Gearbox output flange 18 is then inserted into expanded first end 34 as shown in FIG. 4, so that its splines 56 on the gearbox output flange 18 intermesh and mate with splines 58 on the flange portion 16 of constant velocity universal joint 14. Preferably, the torque is transferred in this manner between gearbox 11 and propeller shaft 12. When gearbox flange 18 is properly inserted into cavity 51, first end 34 of connector member 32 radially returns to its original static position, whereby each tooth edge 46 is received by groove 62 in outside surface 60 of flange 18 in a snap-fit manner, thereby securing connector member 32 at the first end 34. It is contemplated, of course, that depending on the type of material used to form connector member 32, the tooth edge 46/groove 62 engagement may be not be necessary, but instead a secure connection may still be achieved by extending the first wall member 64 which forms connector first end 34 further radially inward to provide a greater retaining area.

While force is being asserted onto springs 52 by the adjoining constant velocity joint 14 and gearbox 11, springs 52 are likewise applying force back against joint 14 and gearbox 11 order to maintain the contact between the splines and also to bias groove 62 onto tooth 46. Again, depending on the degree of bias desired within connector assembly 30, one or more wave springs 52 may be utilized to provide the desired force.

Thus, connector assembly 30 also keeps axial runout between the mating components of gearbox output flange 18 and constant velocity joint 14 low. During operation, in order to transmit torque between gearbox 11 and constant velocity joint 14, the mating flange surfaces are splined as shown in FIGS. 1–2. More particularly, splines 56 on gearbox flange 18 engage and intermesh with splines 58 formed on flange 16 of constant velocity universal joint 14 so that one may transmit torque to the other during operation.

It is understood, of course, that while the forms of the invention herein shown and described include the best mode contemplated for carrying out the present invention, they are not intended to illustrate all possible forms thereof. It will also be understood that the words used are descriptive rather than limiting, and that various changes may be made without departing from the spirit or scope of the invention as claimed below.

What is claimed is:

1. A connector for securing a constant velocity universal joint having an outer race to a coupling member, the outer race and coupling member each having an inside mating surface and an outer end, the connector comprising:

an annular member having a first end, a second end, and a plurality of openings extending axially from the first end toward said second end to define a series of radially expanding panels for receiving the constant velocity universal joint and coupling member such that their respective inside mating surfaces engage each other, the first end of the annular member for engaging the outer end of the coupling member and the second end of the annular member disposed proximate the outer end of said outer race; and at least one spring disposed between the second end of the annular member and the outer race for accommodating axial deviation in the connector.

2. The connector of claim 1 wherein the first end of the annular member has an annular tooth for receiving the coupling member.

3. The connector of claim 1 wherein the plurality of openings extend axially to a location partially along the length of the annular member.

4. The connector of claim 1 wherein the at least one spring is an annular wave spring.

5. The connector of claim 1 wherein the at least one spring is a pair of annular wave springs.

6. The connector of claim 3 wherein the location partially along the length of the annular member is in a range from 60%–90% of the overall length of the annular member measured from the first end of the annular member to the second end of the annular member.

7. A constant velocity joint and gearbox assembly comprising:

a constant velocity joint having an outer race with a flange portion including a mating surface, and an end surface;

a gearbox having a coupling member with a coupling mating surface for engaging said flange portion mating surface, and a coupling end surface having an annular groove formed therein;

a connector member having an annular cross-section for receiving therein said outer race and said coupling member, said connector member including a connector first end received by said annular groove of said coupling end surface, a connector second end disposed about the outer race end surface, and a plurality of openings running partially axially from said connector first end to connector second end to define a plurality of panels which radially expand in order to receive the outer race and coupling member; and at least one spring disposed between the connector first end and the connector second end for accommodating axial deviation of the connector member.

8. The constant velocity joint and gearbox assembly of claim 7 wherein the at least one spring is an annular wave spring.

9. The constant velocity joint and gearbox assembly of claim 7 wherein the at least one spring is a pair of annular wave springs.

10. The constant velocity joint and gearbox assembly of claim 7 wherein the flange portion mating surface and coupling mating surface each include a plurality of splines for operably engaging each other so that one of the coupling member and constant velocity joint may transmit torque to the other.

* * * * *